United States Patent [19]

Otake

[11] Patent Number: 4,819,144
[45] Date of Patent: Apr. 4, 1989

[54] SWITCHING POWER SUPPLY CIRCUIT WITH STORED CHARGE REMOVAL SWITCH

[75] Inventor: Tetsushi Otake, Saitama, Japan

[73] Assignee: Toko, Inc., Japan

[21] Appl. No.: 224,583

[22] Filed: Jul. 26, 1988

[30] Foreign Application Priority Data

Jul. 31, 1987 [JP] Japan .................. 62-192106

[51] Int. Cl.$^4$ .................................... H02M 3/335
[52] U.S. Cl. ...................... 363/21; 363/131
[58] Field of Search ............ 363/20, 21, 131, 18; 323/289; 307/300

[56] References Cited

U.S. PATENT DOCUMENTS

| | | | |
|---|---|---|---|
| 3,805,094 | 4/1974 | Orlando | 323/289 |
| 4,183,080 | 1/1980 | Liebman | 363/18 |
| 4,312,029 | 1/1982 | Zellmer | 323/289 |
| 4,420,804 | 12/1983 | Nishino | 323/289 |
| 4,499,530 | 2/1985 | Onda et al. | 363/21 |

*Primary Examiner*—William H. Beha, Jr.

[57] ABSTRACT

A switching power supply circuit comprising a main switching element, and a second switching element which is on-off driven by the output of the main switching element. The design is made such that when the main switching element is turned on, the second switching element is turned off, while when the main switching element is turned off, the second switching element is turned on, and unwanted charges stored at the main switching element can be discharged through the second switching element when the main switching element is turned off.

15 Claims, 5 Drawing Sheets

SWITCHING POWER SUPPLY CIRCUIT WITH STORED CHARGE REMOVAL SWITCH

BACKGROUND OF THE INVENTION

1. Field of the Invention

This invention relates to a switching power supply device which is usable as a DC power source for various types of electric apparatus and implements. More particularly, the present invention a switching power source circuit arrangement which is so designed that power loss is reduced and thus efficiency is enhanced.

2. Description of the Prior Art

Referring to FIG. 1 of the accompanying drawings, a pulse-width controlled type switching power supply circuit is shown as an example of the prior-art switching power supply circuit arrangement, wherein a main switching transistor $Q_1$ has its emitter connected to an input terminal 1 to which is applied a DC input voltage $V_i$, the collector of the transistor $Q_1$ being grounded through a primary winding $N_1$ of a transformer T. Furthermore, the transistor $Q_1$ has its base connected to a pulse width control circuit 2 through a base-current limiting resistor $R_1$, and also to the input terminal 1 through a resistor $R_2$ which serves to prevent collector cutoff current from being caused to flow when the transistor $Q_1$ is rendered inoperative. Connected to a secondary winding $N_2$ of the transformer T is a rectifying—smoothing circuit comprising a diode $D_1$ and capacitor $C_1$, whereby a DC output voltage is applied to a load 3.

When the transistor $Q_1$ is turned on, a current is caused to flow from the DC power source connected to the input terminal 1 to the primary winding $N_1$ of the transformer T, and resultant power is stored therein in the form of magnetic energy. Subsequently, when the transistor $Q_1$ is turned off, the magnetic energy stored in the primary winding $N_1$ is caused to appear, in the form of a counterelectromotive force, at the secondary winding $N_2$, thus resulting in the diode $D_1$ being rendered operative so that power is supplied to the load 3.

Output voltage, divided by resistors $R_3$ and $R_4$, is derived and compared in an error amplifier 4 with a reference voltage available from a reference voltage source 5. As a result, a feedback voltage corresponding to the difference between the output voltage and the reference voltage is applied from the error amplifier 4 to the pulse-width controlling circuit 2. With the pulse-width controlling circuit 2, the pulse-width of a drive pulse to turn on the transistor $Q_2$ is determined on the basis of the feedback voltage derived from the error amplifier 4, and the drive pulse is imparted to the base of the transistor $Q_1$ through the resistor $R_1$. More specifically, when the output voltage decreases, the feed voltage also decreases so that drive pulse to increase the "on" period of the transistor $Q_1$ is imparted to the base thereof. Conversely, when the output voltage increases, the feedback voltage also builds up, so that a drive pulse to decrease the "on" period of the transistor $Q_1$ is derived from a voltage comparator 17.

It is usual that the design is made such that only the cutoff and saturation regions of the switching transistor $Q_1$ are utilized to minimize loss which tends to occur during the switching operation. To make the transistor $Q_1$ saturated, it is necessary to flow a sufficient base current to establish a so-called "over-drive" condition.

Let it be now assumed that the potential of the pulse derived from the pulse-width controlling circuit 2, i.e., potential occurring at a point A in FIG. 1, is at low level (i.e., nearly equal to 0 V) with respect to the input voltage $V_i$. Under such a condition, the transistor $Q_1$ is turned on because of the base thereof being positively biased, so that a base current $I_{b1}$ flows through the resistor $R_1$. The values for the resistors $R_1$ and $R_2$ are determined such that there flows such a sufficiently high base current $I_{b1}$ to establish the over-drive condition of the transistor $Q_1$. As a result, a large quantity of charges are stored between the base and the emitter of the transistor $Q_1$. Thus, even when the potential at the point A is changed to high level (nearly equal to $V_i$), a period of time will be taken before the transistor $Q_1$ which has been conducting, is completely turned off. Collector current $I_{c1}$ decreases gradually during the interval between when the transistor $Q_1$ begins to be driven toward "off" state and when it is completely turned off, and thus a counterelectromotive force begins to occur at the transformer T. Consequently, as shown in FIG. 2(a), voltage $V_{CE}$ between the collector and the emitter of the transistor $Q_1$ varies with time, so that there is a period of time $\Delta t$ that the collector-emitter voltage $V_{CE}$ and the collector current $I_{c1}$ occurs at the same time. The product of the voltage and current which occurs during the period of time $\Delta t$ is termed "turn-off loss", which accounts for a large proportion of the total loss of the transistor $Q_1$.

With the conventional circuit arrangement of FIG. 1, to reduce such turn-off loss by reducing $\Delta t$, it is only required that the value for the resistor $R_2$ be reduced so as to permit of quick discharge of charges accumulated between the base and the emitter of the transistor $Q_1$. However, there is a tendency that the base bias voltage of the transistor $Q_1$ is changed if the value for $R_1$ alone is reduced; thus, the value for the resistor $R_1$ should also be reduced Disadvantageously, however, if both the value for the resistor $R_1$ and that for the resistor $R_2$ are reduced, then the base current $I_{b1}$ of the transistor $Q_1$ will be further increased. As known in the art, the base current $I_{b1}$ is a current needed to turn on the transistor $Q_1$ and does not contribute directly to conversion efficiency. Thus, the increase in the base current $I_{b1}$ will lead to a decrease in the efficiency. As will be seen from the foregoing discussion, the prior-art arrangement is disadvantageous in that a certain amount of turn-off loss is inevitably caused since an attempt to reduce the value for the resistor $R_1$ has its limit.

SUMMARY OF THE INVENTION

Accordingly, it is an object of the present invention to provide a switching power supply circuit which is so designed that turn-off loss is greatly reduced by reducing the aforementioned $\Delta t$ and the efficiency is remarkably enhanced by rendering the circuit operable even if the base current $I_{b1}$ of a switching transistor is reduced.

According to an aspect of the present invention, there are provided a main switching element, and a second switching element which is on-off driven by the output of the main switching element. The design is made such that when the main switching element is turned on, the second switching element is turned off, while when the main switching element is turned off, the second switching element is turned on, and unwanted charges stored at the main switching element can be discharged through the second switching element when the main switching element is turned off.

Other objects, features and advantages of the present invention will become apparent from the ensuing description taken in conjunction with the accompanying drawings.

DESCRIPTION OF THE PREFERRED EMBODIMENTS

Figure 1:
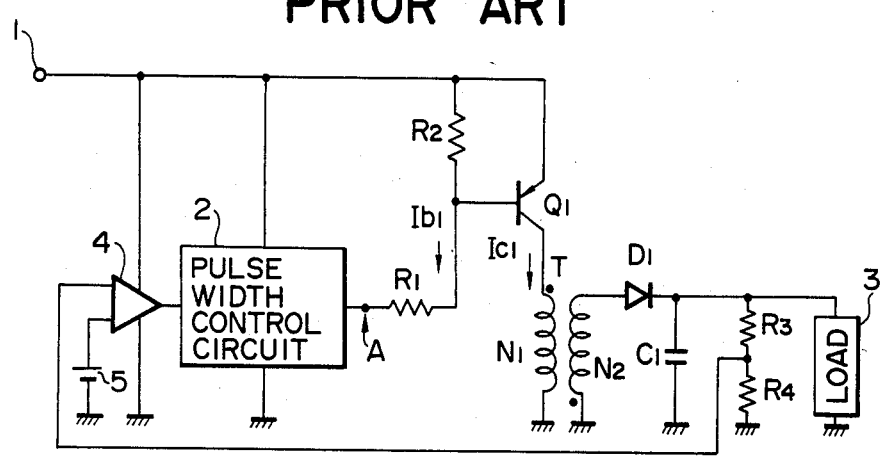
FIG. 1 is a circuit diagram showing a conventional switching power supply circuit.
Figure 3:
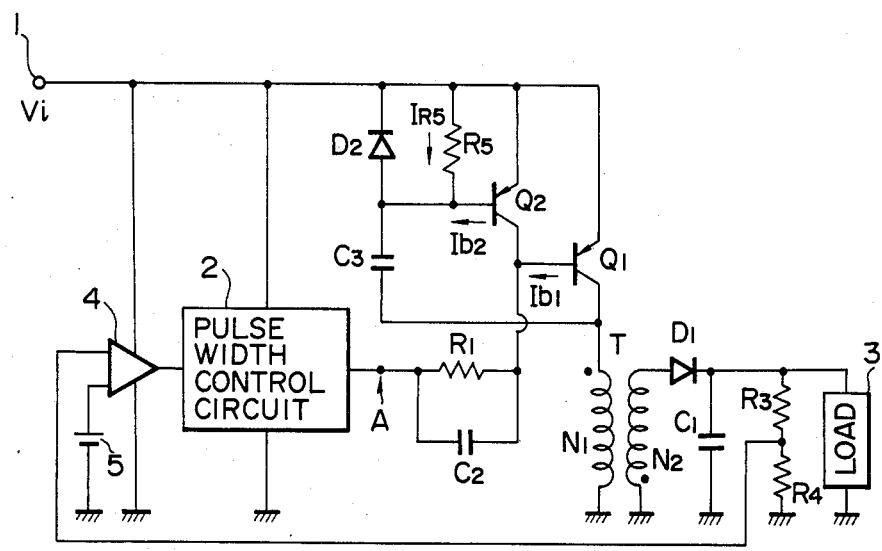
FIG. 3 is a circuit diagram showing an embodiment of the present invention.

Referring to FIG. 3, there is shown the switching power supply circuit according to an embodiment of the present invention, wherein parts corresponding to FIG. 1 are indicated by like reference numerals. A further explanation of such parts will be omitted.

As will be appreciated, the switching power supply circuit of this embodiment is characterized in that there are provided a main switching transistor $Q_1$, and a second switching transistor $Q_2$ which is arranged to be on-off driven by the output of the main switching transistor $Q_1$.

The transistor $Q_2$ has its emitter connected to an input terminal 1, the collector thereof being coupled to the base of the main transistor $Q_1$. The base of the transistor $Q_2$ is also connected to the input terminal 1 through a parallel circuit of a base-emitter protecting diode $D_2$ and collector cutoff current preventing resistor $R_5$, and coupled to a connection point between the collector of the main transistor $Q_1$ and a primary winding $N_1$ of a transformer T. The base of the main transistor $Q_1$ is connected to a pulse width controlling circuit 2 through a parallel circuit of a current limiting resistor $R_1$ and capacitor $C_2$. The capacitor $C_2$ serves to speed up the turning-on of the main transistor $Q_1$.

With the foregoing arrangement, let it now be assumed that the potential at a point A becomes zero level. Under such a condition, the transistor $Q_1$ is turned on because of its base being positively biased, so that base current $I_{b1}$ is caused to flow through the parallel circuit of the resistor $R_1$ and capacitor $C_1$. When the transistor $Q_1$ is turned on, the collector potential thereof becomes substantially equal to the input voltage $V_i$. Thus, the second transistor $Q_2$, which has its base connected to the collector of the main transistor $Q_1$ through a capacitor $C_3$ is not positively biased and hence turned off, having no effect on the turning-on operation of the main transistor $Q_1$ at all.

Figure 2A:
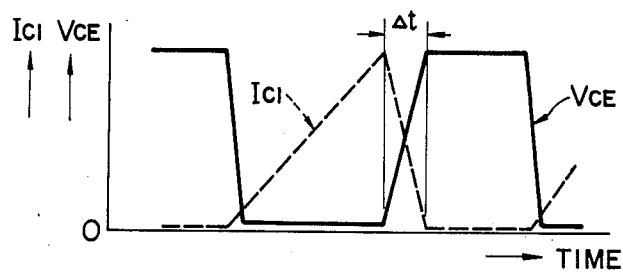
FIG. 2(a) is a waveform view illustrating the voltage-current characteristics of a main transistor provided in the conventional circuit arrangement.
Figure 2B:
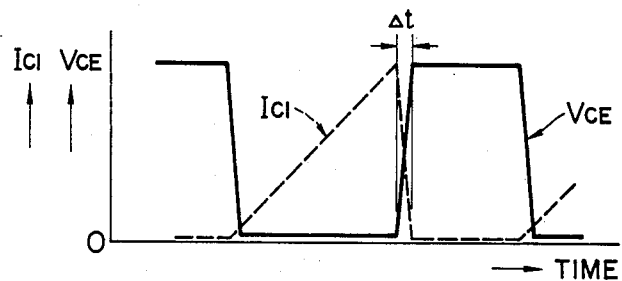
FIG. 2(b) is a waveform view illustrating the voltage-current characteristics of a main transistor provided in the circuit embodying the present invention.

When the potential at the point A becomes high level, the transistor $Q_1$ is released from the positively biased state and thus turned off so that the flow of base current $I_{b1}$ is interrupted. As mentioned above, a certain length of time occurs between the point of time when the main transistor $Q_1$ begins to be urged toward "off" state and the point of time when it is completely turned off, and the collector current $I_{c1}$ gradually decreases down to zero, so that a gradually increasing counterelectromotive force is generated at the transformer T. As a result, the collector voltage of the main transistor $Q_1$ gradually becomes lower than the input voltage $V_i$, and since the collector of the main transistor $Q_1$ is connected to one end of a capacitor $C_3$, a current $I_{R5}$ which tends to charge the capacitor $C_3$, and base current $I_{b2}$ begin to flow through the resistor $R_5$ and the base of transistor $Q_2$ respectively. Thus, the transistor $Q_2$ is turned on by the base current $I_{b2}$, so that charges accumulated between the base and the emitter of the main transistor $Q_1$ are discharged at once. In this way, the main transistor $Q_1$ is abruptly urged toward "off" state, and as shown in FIG. 2(b), the $\Delta t$ is greatly reduced so that the turn-off loss is reduced accordingly.

Figure 4:
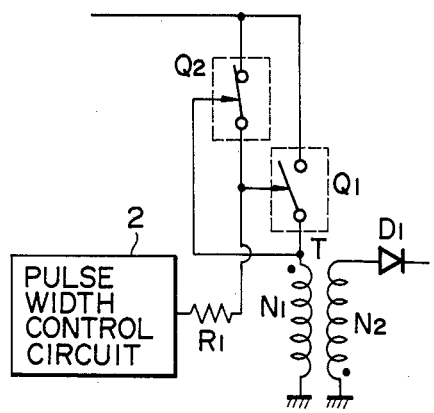
FIG. 4 is a schematic view illustrating the main portion of the circuit shown in FIG. 3.

Referring to FIG. 4, the main portion of the switching power supply circuit according to this embodiment is conceptually illustrated, wherein the main transistor $Q_1$, and the second transistor $Q_2$ are shown symbolically as switches. In this figure, the two switches $Q_1$ and $Q_2$ are oppositely operated in interlocking relationship with each other so that when the switch $Q_1$ is turned on, the switch $Q_2$ is turned off while when the switch $Q_1$ is turned off, the switch $Q_2$ is turned on; and the output of the switch $Q_1$ constitutes a signal source for turning on and off the switch $Q_2$.

In the above-described embodiment, the signal for driving to turn on and off the second transistor $Q_2$ was taken out of the connection point between the collector of the main transistor $Q_1$ and the primary winding $N_1$ of the transformer T. However, it is only required that such a driving signal be derived from a signal source provided by the output of the main switch element, and various modifications will be possible with respect to the manner in which such a driving signal is taken out. Referring to FIGS. 5 to 8, there shown different arrangements for taking out a driving signal.

Figure 5:
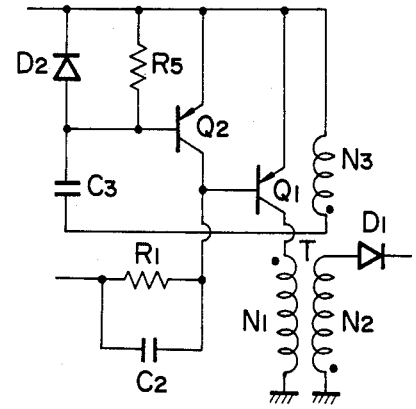
FIGS. 5 to 13 are circuit diagrams showing other various embodiments of the present invention respectively.

FIG. 5 shows a circuit arrangement in which a tertiary winding $N_3$ is provided on the transformer T, the tertiary winding being connected at one end to the emitter of the main transistor $Q_1$ and at the other end to the base of the transistor $Q_2$ through a capacitor $C_3$, and the remainder thereof is similar to FIG. 3. With this arrangement, too, an electromotive force at the primary winding $N_1$ and that at the tertiary winding $N_3$ occur in a time series and are directed in the same direction; thus, the same effect as that of the circuit arrangement shown in FIG. 3 can be produced.

Figure 6:
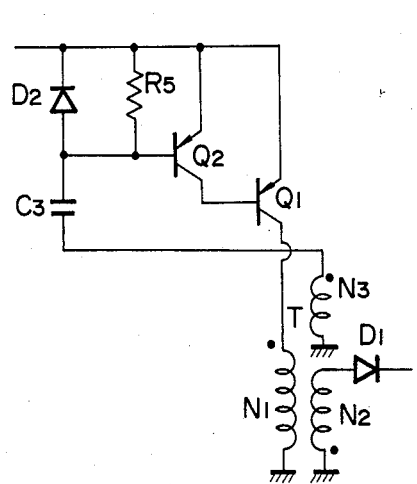

FIG. 6 illustrates a circuit arrangement similar to that of FIG. 5, except that the tertiary winding $N_3$ is grounded at one end instead of being connected to the emitter of the main transistor $Q_1$. With this arrangement, too, an electromotive force at the primary winding $N_1$ and that at the tertiary winding $N_3$ occurs in a time series and are directed in the same direction, and thus it operates in a manner similar to the manner in which the circuit of FIG. 5 operates.

Figure 7:
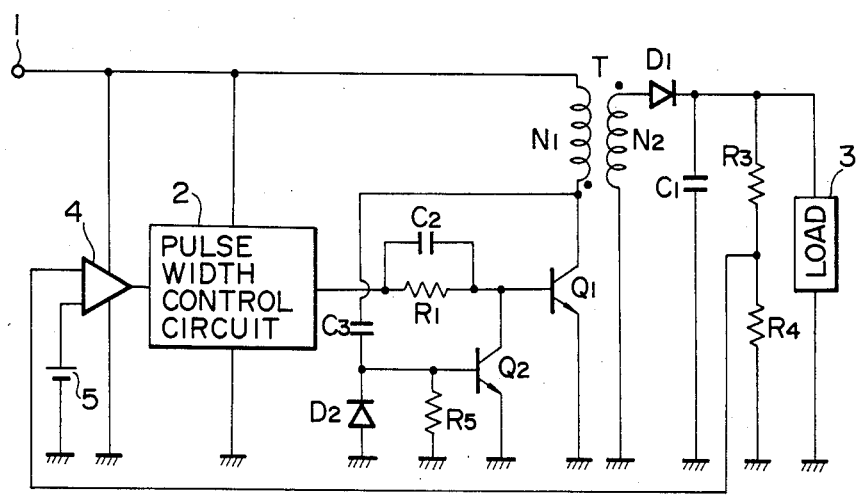

FIG. 7 shows a circuit arrangement in which NPN transistors are used as the main transistor $Q_1$ and second transistor $Q_2$; the main transistor $Q_1$ has its collector connected to the input terminal 1 through the primary winding $N_1$, the emitter thereof being grounded; and the second transistor $Q_2$ also has its emitted grounded, the base thereof being grounded through the parallel circuit of the resistor $R_5$ and diode $D_2$. In this arrangement, a signal for driving the second transistor $Q_2$ is taken out of the connection point between the collector of the main transistor $Q_1$ and the primary winding $N_1$ of the transformer T as in the embodiment of FIG. 3.

Figure 8:
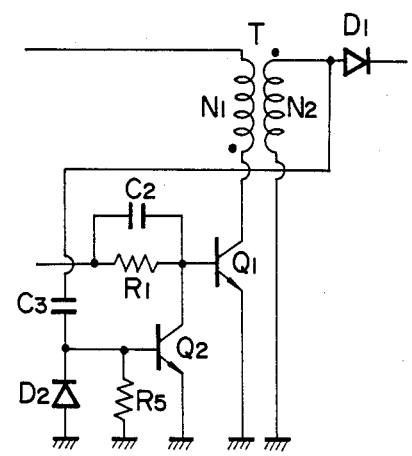

FIG. 8 illustrates a partly modified version of the circuit shown in FIG. 7, wherein a driving signal is taken out of the connection point between the secondary winding $N_2$ and the diode $D_1$.

Although in the foregoing embodiments, description has been made of the cases where ordinary transistors were used as switching elements, it goes without saying that such transistors may be replaced with MOS transistors.

Furthermore, it is possible that the second switching element may be constituted by a photocoupler.

Referring to FIGS. 9 to 13, there are shown examples in which the second switching element is constituted by a photocoupler 6 comprising a phototransistor $Q_3$ and light-emitting diode $D_3$.

Figure 9:
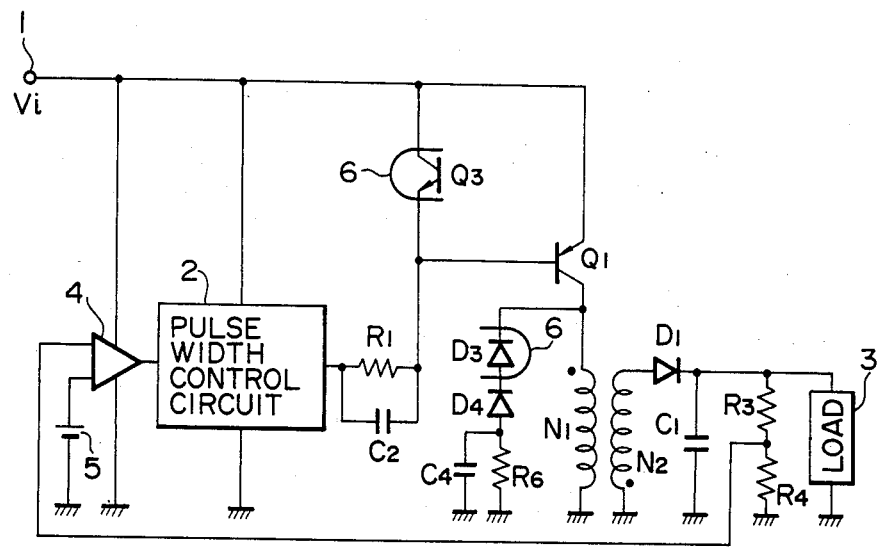

FIG. 9 illustrates an arrangement in which the phototransistor $Q_3$ of the photocoupler 6 is connected between the input terminal 1 and the base of the main transistor $Q_1$ which is a PNP transistor; the light-emitting diode $D_3$ of the photocoupler 6 is connected at the anode thereof to the collector of the main transistor $Q_1$, the cathode of the light-emitting diode being connected in series with a protective diode $D_4$ for protecting the light-emitting diode $D_3$ from being damaged by an inverse voltage, and a current limiting resistor $R_6$, and grounded therethrough. A capacitor $C_4$, which is connected in parallel with the resistor $R_6$, serves as a speed-up capacitor but it may be omitted. The remaining portion of the arrangement shown in FIG. 9 is similar to FIG. 3

When the main transistor $Q_1$ is turned on, the light-emitting diode $D_3$ is provided with an inverse voltage and thus turned off. When the main transistor $Q_1$ is turned off, the light-emitting diode $D_3$ is rendered operative by a flyback voltage at the primary winding $N_1$ so as to emit light. Light emitted by the light-emitting diode $D_3$ is received by the phototransistor $Q_3$ so that the latter is turned on and as a result, charges accumulated between the base and the emitter of the main transistor $Q_1$ are discharged at once.

Figure 10:
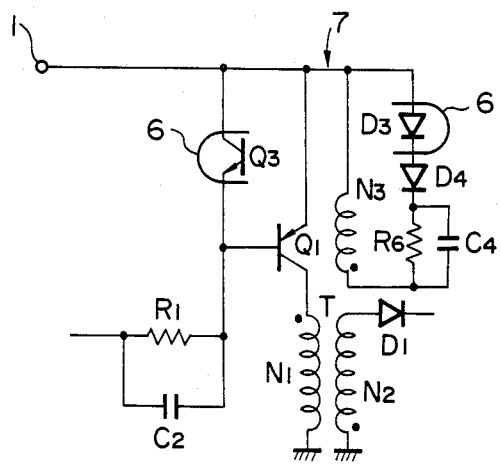

FIG. 10 shows an arrangement in which a tertiary winding $N_3$ is provided on a transformer T; a series circuit comprising a light-emitting diode $D_3$, protective diode $D_4$ and resistor $R_6$ is connected in series with the tertiary winding $N_3$; and a speed-up capacitor $C_4$ is connected in parallel with the resistor $R_6$. This circuit takes advantage of the fact the flyback voltage which occurs at the primary winding $N_1$ when the main transistor $Q_1$ is turned off, is induced in the tertiary winding $N_3$ which is magnetically coupled to the primary winding $N_1$. The light-emitting diode $D_3$ is connected to the transformer T in such a manner that it is forwardly biased and enabled to emit light when the main transistor $Q_1$ is turned off. In this way, the circuit arrangement of FIG. 10 is capable of producing similar effect to that of FIG. 9. The operation will remain unchanged even if the connection point between the light-emitting diode $D_3$ and the tertiary winding $N_3$ is coupled to the input terminal 1 as indicated by a broken line 7.

Figure 11:
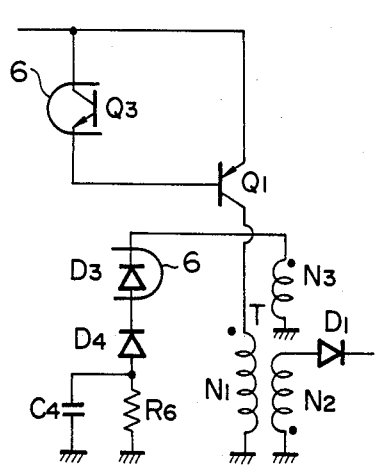

FIG. 11 shows an arrangement wherein a tertiary winding $N_3$ is provided on a transformer and grounded at one end; the tertiary winding $N_3$ is further grounded at the other end through a series circuit comprising a light-emitting diode $D_3$, diode $D_4$ and resistor $R_6$; and a speed-up capacitor $C_4$ is connected in parallel with the resistor $R_6$.

With this arrangement, too, only when the main transistor $Q_1$ is turned off, the light-emitting diode $D_3$ is made to emit light so that the phototransistor $Q_3$ is turned on, thus resulting in the turn-off loss being reduced.

Figure 12:
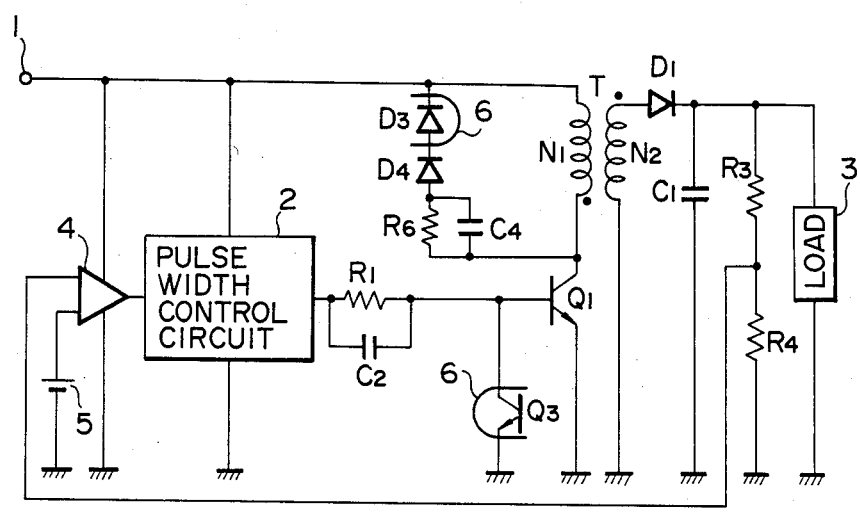

FIG. 12 shows an arrangement using an NPN transistor as a main transistor $Q_1$ and being similar to the circuit arrangement of FIG. 9, wherein the main transistor $Q_1$ is grounded at the base thereof through a photocoupler 6 and phototransistor $Q_3$, the collector of the main transistor $Q_1$ being connected to an input terminal 1 through a primary winding $N_1$ of a transformer T. A series circuit comprising a light-emitting diode $D_3$, diode $D_4$ and resistor $R_6$ is connected across the primary winding $N_1$, and a speed-up capacitor $C_4$ is connected in parallel with the resistor $R_6$.

When the main transistor $Q_1$ is turned on, an inverse voltage is applied the light-emitting diode $D_3$ so that the latter is turned off. On the other hand, when the main transistor $Q_1$ is turned off, flyback voltage at the primary winding $N_1$ is applied to the light-emitting diode $D_3$ so that the latter is forwardly biased and caused to emit light, and the phototransistor $Q_3$ is turned off.

Figure 13:
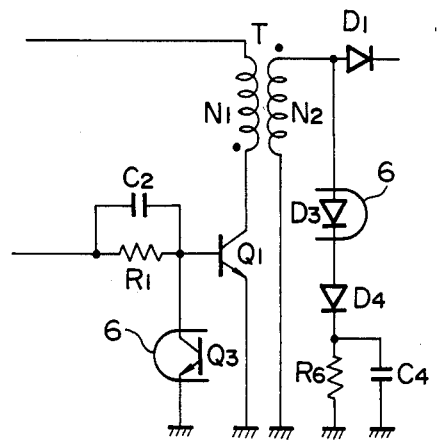

FIG. 13 shows a partially modified version of the circuit shown in FIG. 12, wherein a signal for driving the phototransistor $Q_3$ is taken out of the connection point between the secondary winding $N_2$ and the diode $D_1$.

As will be appreciated from the foregoing discussion, according to the present invention, charges stored accumulated between the base and the emitter of the main transistor are quickly discharged through the second transistor immediately after the main transistor is turned off. Thus, the $\Delta t$ shown in FIG. 2 is greatly reduced so that turn-off loss is remarkably reduced.

Generally, the base current $I_{b1}$ is a wasteful current that does not contribute to power conversion efficiency, and thus it is desirable that such a current be minimized. To this end, according to the present invention, the transistor $Q_2$ is utilized as an active resistor instead of the resistor $R_2$ of the prior-art circuit (FIG. 1), and the necessity to provide the resistor $R_2$ is eliminated. Thus, the value for the resistor $R_1$ can be determined from the actually required amount of base current $I_{b1}$. In other words, according to the present invention, it is possible to eliminate such a problem with the prior art that the value for the resistor $R_1$ inevitably becomes low due to the necessity to make low the value for the resistor $R_2$ so as to cause charges accumulated at the main transistor $Q_1$ to be discharged rapidly, and thus it is possible to minimize the base current $I_{b1}$.

As will be appreciated from the above discussion, according to the present invention, it is possible to greatly reduce turn-off loss and base current $I_{b1}$ at the same time, thereby achieving a remarkably enhanced power conversion efficiency. The result of experiments conducted by using a multi-output type flyback converter with input voltage 9.6 V, output voltage of 9 V, 15 V, 20 V and −8 V, and power output of 800 mW, indicated that with the prior art, the conversion efficiency was 77% while with the present invention, such efficiency was as high as 81%, i.e., an improvement as great as 9% over the prior art was achieved.

While the present invention has been illustrated and described with respect to specific embodiments thereof, it is to be understood that various changes and modifications will become possible within the scope of the appended claims.

I claim:

1. A switching power supply circuit wherein an input DC voltage is applied to an input terminal through an inductance element and on-off controlled by means of switching elements so that a pulse voltage is provided, and said pulse voltage is rectified and smoothed out to provide a predetermined DC output voltage, said switching power supply circuit comprising:
   (1) a transformer including at least a primary and a secondary winding, said primary winding being arranged to be provided with said input DC voltage;
   (2) a main switch element for on-off controlling said input DC voltage applied to said primary winding of said transformer and causing a pulse voltage to be generated at said secondary winding of said transformer; and
   (3) a second switch element arranged to be on-off driven by the output of said main switch element so that when said main switch element is turned on, said second switch element is turned off while when said main switch element is turned off, said second switch element is turned on, whereby unwanted charges accumulated at said main switch element are discharged through said second switch element when said main switch element is turned off.

2. A switching power supply circuit according to claim 1, wherein each of said main second switch element is constituted by a PNP transistor having a base, an emitter and a collector; the base of said main switch element is connected to the collector of said second switch element; the emitters of said main and second switch elements are coupled to said input terminal; and the base of said second switch element is connected to said input terminal through a parallel circuit of a diode and resistor.

3. A switching power supply circuit according to claim 2, wherein the base of said second switch element is connected to the collector of said main switch element through a capacitor.

4. A switching power supply circuit according to claim 2, wherein said transformer is provided with a tertiary winding; said tertiary winding is connected at one end thereof to said input terminal; and the base of said second switch element is connected to the other end of said tertiary winding through a capacitor.

5. A switching power supply circuit according to claim 2, wherein said transformer is provided with a tertiary winding, said tertiary winding is grounded at one end thereof; and the base of said second switch element is connected to the other end of said tertiary winding through a capacitor.

6. A switching power supply circuit according to claim 1, wherein each of said main and second switch elements is constituted by an NPN transistor having a base, an emitter and a collector; the collector of said main switch element is connected to said input terminal through the primary winding of said transformer; the base of said main switch element is connected to the collector of said second switch element; the emitters of said main and second switch elements are grounded; and the base of said second switch element is grounded through a parallel circuit of a diode and resistor.

7. A switching power supply circuit according to claim 6, wherein the base of said second switch element is connected to the collector of said main switch element through a capacitor.

8. A switching power supply circuit according to claim 6, wherein the base of said second switch element is connected to the secondary winding of said transformer.

9. A switching power supply circuit according to claim 1, wherein said main switch element is constituted by a PNP transistor having a base, an emitter and a collector; said second switch element is constituted by a photocoupler comprising a phototransistor and light-emitting diode; and said phototransistor is connected between the base of said main switch element and said input terminal.

10. A switching power supply circuit according to claim 9, wherein the collector of said main switch element is grounded through a series circuit of a light-emitting diode, diode and resistor.

11. A switching power supply circuit according to claim 9, wherein said transformer is provided with a tertiary winding; and a series circuit of a light-emitting diode, diode, and resistor is connected to said tertiary winding.

12. A switching power supply circuit according to claim 9, wherein said transformer is provided with a tertiary winding grounded at one end thereof; and the other end of said tertiary winding is grounded through a series circuit of a light-emitting diode, diode and resistor.

13. A switching power supply circuit according to claim 1, wherein said main switch element is constituted by an NPN transistor having a base, an emitter and a collector; the collector of said main switch element is connected to said input terminal through the primary winding of said transformer; said second swith element is constituted by a photocoupler comprising a phototransistor and light-emitting diode; and said phototransistor is connected between the base of said main switch element and the ground.

14. A switching power supply circuit according to claim 13, wherein a series circuit of a light-emitting diode, diode and resistor is connected across the primary winding of said transformer.

15. A switching power supply circuit according to claim 13, wherein a series circuit of light-emitting diode, diode and resistor is connected to one end of the secondary winding of said transformer.

* * * * *